United States Patent
Hirano

(10) Patent No.: US 12,528,910 B2
(45) Date of Patent: Jan. 20, 2026

(54) METHOD FOR PRODUCING POLYHYDROXYALKANOATE AND USE OF SAME

(71) Applicant: KANEKA CORPORATION, Osaka (JP)

(72) Inventor: Masaru Hirano, Takasago (JP)

(73) Assignee: KANEKA CORPORATION, Osaka (JP)

( * ) Notice: Subject to any disclaimer, the term of this patent is extended or adjusted under 35 U.S.C. 154(b) by 698 days.

(21) Appl. No.: 17/905,268

(22) PCT Filed: Feb. 4, 2021

(86) PCT No.: PCT/JP2021/004023
§ 371 (c)(1),
(2) Date: Aug. 30, 2022

(87) PCT Pub. No.: WO2021/176941
PCT Pub. Date: Sep. 10, 2021

(65) Prior Publication Data
US 2023/0102977 A1    Mar. 30, 2023

(30) Foreign Application Priority Data
Mar. 2, 2020   (JP) ................. 2020-035311

(51) Int. Cl.
*C08G 63/664*   (2006.01)
*C08J 3/12*   (2006.01)

(52) U.S. Cl.
CPC .............. *C08G 63/664* (2013.01); *C08J 3/12* (2013.01); *C08J 2399/00* (2013.01)

(58) Field of Classification Search
None
See application file for complete search history.

(56) References Cited

U.S. PATENT DOCUMENTS 5,798,440 A * 8/1998 Liddell ............... C08J 3/16
528/499
5,952,460 A   9/1999 Liddell et al.
(Continued)

FOREIGN PATENT DOCUMENTS

JP   2001-114901 A   4/2001
JP   2002-240033 A   8/2002
(Continued)

OTHER PUBLICATIONS

Chinese Office Action issued Dec. 20, 2024 in Chinese Patent Application No. 202180018180.4 with English Machine translation, 8 pgs.
(Continued)

*Primary Examiner* — Megan McCulley
(74) *Attorney, Agent, or Firm* — Oblon, McClelland, Maier & Neustadt, L.L.P.

(57) ABSTRACT

The object of the present invention is to provide a production method which makes it possible to obtain a PHA with a simple operation. The object can be attained by providing a method for producing a polyhydroxyalkanoate, the method including the steps of: (a) preparing an aqueous polyhydroxyalkanoate suspension having a pH of not more than 7; and (b) heating the aqueous polyhydroxyalkanoate suspension, prepared in the step (a), at a temperature set at 80° C. to 300° C. in a twin screw extruder so as to aggregate a polyhydroxyalkanoate.

8 Claims, 4 Drawing Sheets

(56) References Cited

U.S. PATENT DOCUMENTS

| | | | |
|---|---|---|---|
| 2004/0059047 A1* | 3/2004 | Autran | C08G 63/88 |
| | | | 524/539 |
| 2011/0256398 A1* | 10/2011 | Kann | D01F 6/625 |
| | | | 428/364 |
| 2011/0293938 A1 | 12/2011 | Takita et al. | |
| 2017/0245494 A1* | 8/2017 | Bardosh | A01N 25/10 |
| 2018/0282489 A1* | 10/2018 | Baer | A61L 27/18 |
| 2020/0283600 A1* | 9/2020 | Shi | C08K 13/06 |
| 2021/0403703 A1 | 12/2021 | Fukumoto | |
| 2022/0119598 A1* | 4/2022 | Loos | B01F 23/511 |
| 2024/0227371 A1* | 7/2024 | Okada | B32B 15/09 |
| 2025/0136785 A1* | 5/2025 | Mondonico | B29B 9/02 |

FOREIGN PATENT DOCUMENTS

| | | |
|---|---|---|
| JP | 2006-168159 A | 6/2006 |
| JP | 3773526 B2 | 5/2008 |
| JP | 2019-97518 A | 6/2019 |
| WO | WO 2012/029448 A1 | 3/2012 |
| WO | WO 2018/070492 A1 | 4/2018 |

OTHER PUBLICATIONS

International Search Report issued Apr. 8, 2021 in PCT/JP2021/004023 (with English translation), 4 pages.

International Preliminary Report on Patentability and Written Opinion issued Sep. 6, 2022 in PCT/JP2021/004023 with English translation). 9 pages.

* cited by examiner

METHOD FOR PRODUCING POLYHYDROXYALKANOATE AND USE OF SAME

CROSS-REFERENCE TO RELATED APPLICATIONS

This application is a national stage of International Application No. PCT/JP2021/004023 filed on Feb. 4, 2021, and claims priority to Japanese Application No. 2020-035311 filed on Mar. 2, 2020, the disclosures of which are incorporated herein by reference in their entireties.

TECHNICAL FIELD

The present invention relates to a method for producing a polyhydroxyalkanoate and use thereof.

BACKGROUND ART

Polyhydroxyalkanoates (hereinafter, may be referred to as "PHAs") are known to have biodegradability.

PHAs, which are produced by microorganisms, are accumulated within cells of the microorganisms. As such, in order to use a PHA as a plastic, a step of separating the PHA from a cell of a microorganism and refining the PHA is required. The step of separating and refining a PHA involves crushing a cell of a PHA-containing microorganism or solubilizing an organism-derived component other than a PHA, and then taking out the PHA from an obtained aqueous suspension. In so doing, a separating operation, e.g., centrifugal separation, filtration, drying, or the like, is carried out. In a drying operation, a spray dryer, a fluidized-bed dryer, a drum dryer, or the like is used, and a spray dryer is preferably used because it is easy to operate (Patent Literature 1).

CITATION LIST

Patent Literature

[Patent Literature 1]
PCT international application publication, No. WO2018/070492

SUMMARY OF INVENTION

Technical Problem

However, spray drying has room for improvement.

The object of the present invention is to provide, as an alternative to spray drying, a production method which make it possible to obtain a PHA with a simple operation.

Solution to Problem

As a result of conducting diligent studies in order to attain the above object, the inventor of the present invention newly found that a PHA is easily obtained by, with use of a twin screw extruder, extruding an aqueous PHA suspension while heating the aqueous PHA suspension at a specific temperature. Consequently, the inventor of the present invention completed the present invention.

Therefore, an aspect of the present invention relates to a method for producing a polyhydroxyalkanoate, the method including the steps of (a) preparing an aqueous PHA suspension having a pH of not more than 7; and (b) heating the aqueous PHA suspension, prepared in the step (a), at a temperature set at 80° C. to 300° C. in a twin screw extruder so as to aggregate a PHA.

Further, an aspect of the present invention relates to a polyhydroxyalkanoate aggregate containing a polyhydroxyalkanoate in an amount of not less than 97% by weight, the polyhydroxyalkanoate aggregate having a volume median diameter of not less than 300 μm.

Advantageous Effects of Invention

According to an aspect of the present invention, it is possible to obtain a PHA with a simple operation.

DESCRIPTION OF EMBODIMENTS

Figure 1:
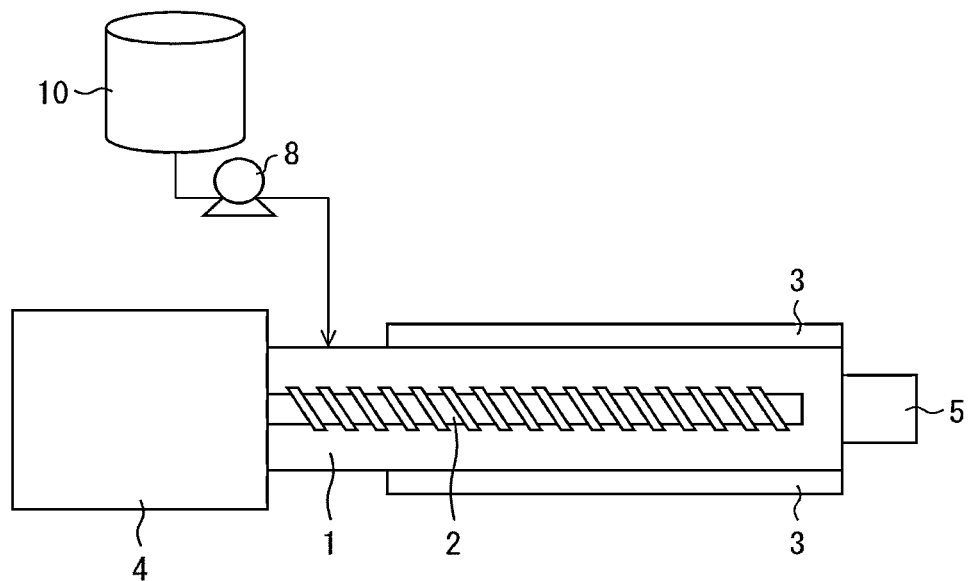
FIG. 1 is a drawing schematically illustrating a method for producing a PHA in accordance with an embodiment of the present invention.

The following description will discuss embodiments of the present invention in detail. Unless otherwise specified in this specification, a numerical range expressed as "A to B" means "not less than A and not more than B." All literatures listed herein are incorporated herein by reference.

1. Outline of an Embodiment of the Present Invention

A method for producing a PHA in accordance with an embodiment of the present invention (hereinafter, referred to as "present production method") is a method including the steps of: (a) preparing an aqueous PHA suspension having a pH of not more than 7; and (b) heating the aqueous PHA suspension, prepared in the step (a), at a temperature set at 80° C. to 300° C. in a twin screw extruder so as to aggregate a PHA.

The inventor of the present invention considered that, in a case where spray drying is carried out in production of a PHA, there are the following problems. For example, in a spray drying operation, it is necessary to evaporate all water contained in an aqueous suspension. This requires enormous thermal energy. Furthermore, a spray dryer used in the spray drying operation tends to be large in size. This causes a problem that a large area is required to install facilities. Moreover, in order to send, to a spray dryer, an aqueous PHA suspension which has a pH of not more than 7 and which is highly concentrated, it is necessary to add a dispersion agent to the aqueous PHA suspension. This has room for improvement from the viewpoint of a production cost.

Under the circumstances, the inventor of the present invention conducted diligent studies, aiming to develop an alternative to spray drying. As a result, the inventor of the present invention found that a method in which a twin screw extruder is used is effective. Specifically, for the first time, the inventor of the present invention found it possible to obtain a PHA aggregate by introducing an aqueous PHA suspension into a twin screw extruder and extruding the aqueous PHA suspension. There has been no report on use of a twin screw extruder in a step of drying an aqueous PHA suspension, and the above findings made by the inventor of the present invention are surprising.

Furthermore, the inventor of the present invention indicated a possibility that a PHA aggregate is obtained more efficiently by employing the above method and also a possibility that a useful PHA aggregate which has not conventionally existed (for example, a PHA aggregate which has a novel physical property) is obtained by employing the above method.

Thus, according to the present production method, it is possible to obtain a PHA with a simple operation. Moreover, since the present production method is a method which is carried out with use of continuous production facilities, it is possible to realize a saving in space for facilities. As a result, the present production method also has an advantage of facilitating installation and movement of a production site. From this viewpoint, it can be said that the present production method is a method for continuously producing a PHA. As described above, the present production method is extremely advantageous in production of a PHA.

Note that, in this specification, the "twin screw extruder" used in the present production method also includes a twin screw kneader. Features of the present production method will be described below in detail.

2. Method for Producing PHA

The present production method includes the following steps (a) and (b) as essential steps.

Step (a): a step of preparing an aqueous PHA suspension having a pH of not more than 7.

Step (b): (b) heating the aqueous PHA suspension, prepared in the step (a), at a temperature set at 80° C. to 300° C. in a twin screw extruder so as to aggregate a PHA.

(Step (a))

In the step (a) of the present production method, an aqueous PHA suspension having a pH of not more than 7 is prepared. In the aqueous suspension, a PHA is present in a state of being dispersed in an aqueous medium. Hereinafter, the aqueous suspension containing at least the PHA may be abbreviated to "aqueous PHA suspension".

<PHA>

In this specification, the term "PHA" is a generic term for polymers in each of which a monomer unit is a hydroxyalkanoic acid. A hydroxyalkanoic acid which is a constituent of the PHA is not particularly limited, and examples thereof include 3-hydroxybutanoic acid, 4-hydroxybutanoic acid, 3-hydroxypropionic acid, 3-hydroxypentanoic acid, 3-hydroxyhexanoic acid, 3-hydroxyheptanoic acid, and 3-hydroxyoctanoic acid. The polymers can be homopolymers or copolymers each of which contains two or more types of monomer units.

More specifically, examples of the PHA include poly(3-hydroxybutyrate) (P3HB), poly(3-hydroxybutyrate-co-3-hydroxyhexanoate) (P3HB3HH), poly(3-hydroxybutyrate-co-3-hydroxyvalerate) (P3HB3HV), poly(3-hydroxybutyrate-co-4-hydroxybutyrate) (P3HB4HB), poly (3-hydroxybutyrate-co-3-hydroxyoctanoate) (P3HB3HO), poly(3-hydroxybutyrate-co-3-hydroxyoctadecanoate) (P3HB3HOD), poly(3-hydroxybutyrate-co-3-hydroxydecanoate) (P3HB3HD), and poly(3-hydroxybutyrate-co-3-hydroxyvalerate-co-3-hydroxyhexanoate) (P3HB3HV3HH). Among these examples, P3HB, P3HB3HH, P3HB3HV, and P3HB4HB are preferable because they are easy to industrially produce.

Further, P3HB3HH, which is a copolymer of 3-hydroxybutyric acid and 3-hydroxyhexanoic acid, is more preferable from the following viewpoints: (i) by changing a composition ratio of repeating units, it is possible to cause a change in melting point and crystallinity and consequently in physical properties, such as a Young's modulus and heat resistance, of P3HB3HH and to enable P3HB3HH to have physical properties between the physical properties of polypropylene and the physical properties of polyethylene; and (ii) P3HB3HH is a plastic that is easy to industrially produce as described above and has useful physical properties.

In an embodiment of the present invention, a composition ratio of repeating units in P3HB3HH is such that a composition ratio of a 3-hydroxybutyrate unit to a 3-hydroxyhexanoate unit is preferably 80/20 (mol/mol) to 99/1 (mol/mol), and more preferably 85/15 (mol/mol) to 97/3 (mol/mol), from the viewpoint of a balance between plasticity and strength. In a case where the composition ratio of the 3-hydroxybutyrate unit to the 3-hydroxyhexanoate unit is not more than 99/1 (mol/mol), sufficient plasticity is obtained. In a case where the composition ratio is not less than 80/20 (mol/mol), sufficient hardness is obtained.

In the step (a), the aqueous PHA suspension, which is used as a starting material, is not particularly limited, and can be obtained, for example, by a method including a culturing step of culturing a microorganism capable of producing the PHA within a cell of the microorganism and a refining step of decomposing and/or removing a substance other than the PHA after the culture step.

The present production method can include, before the step (a), a step of obtaining the aqueous PHA suspension (for example, a step including the culturing step and the refining step described above). A microorganism used in this step is not particularly limited, provided that the microorganism is capable of producing the PHA within a cell of the microorganism. For example, it is possible to use a microorganism isolated from nature, a microorganism deposited at a depositary institution (for example, IFO, ATCC, or the like) for strains, or a mutant, a transformant, or the like that can be prepared from any of those microorganisms. More specific examples of the microorganism include bacteria of the genera *Cupriavidus*, *Alcaligenes*, *Ralstonia*, *Pseudomonas*, *Bacillus*, *Azotobacter*, *Nocardia*, and *Aeromonas*. Among these examples, the microorganism is preferably a microorganism belonging to the genus *Aeromonas*, *Alcaligenes*, *Ralstonia*, or *Cupriavidus*. In particular, the microorganism is more preferably a strain of *A. lipolytica*, *A. latus*, *A. caviae*, *A. hydrophila*, *C. necator*, or the like, and most preferably *C. necator*.

In a case where the microorganism is one that is inherently not capable of producing a PHA or one that produces only a small amount of a PHA, a transformant obtained by introducing, into the microorganism, a gene of an enzyme that synthesizes an intended PHA and/or a variant of the gene can be also used. The gene of such a PHA synthetase used to prepare the transformant is not particularly limited. The gene of the PHA synthetase is preferably a gene of a PHA synthetase derived from *A. caviae*. By culturing these microorganisms under appropriate conditions, it is possible to obtain cells of the microorganisms having PHAs accumulated within the cells. A method of culturing a cell of the microorganism is not particularly limited. As the method, a method described in, for example, Japanese Patent Application Publication Tokukaihei No. 05-93049 can be employed.

A PHA-containing microorganism prepared by culturing the above microorganism contains a large amount of microbial cell-derived components, which are impurities. As such, ordinarily, the refining step can be carried out in order to decompose and/or remove the impurities other than the PHA. The refining step is not particularly limited, and any physical treatment, any chemical treatment, any biological treatment, or the like that can be arrived at by a person skilled in the art can be employed. For example, a refining method described in International Publication No. WO 2010/067543 is suitably employed.

The amount of the impurities which are to remain in an end product is substantially determined by the above refining step. As such, it is preferable to minimize the impurities. Of course, depending on the purpose of use, it may be acceptable to have the impurities mixed in the end product, provided that the physical properties of the end product are not impaired. However, in a case where a highly pure PHA is required, for example, for medical use, it is preferable to minimize the impurities. In so doing, an index of a degree of refinement can be, for example, the amount of protein contained in the aqueous PHA suspension. The amount of the protein is preferably not more than 30000 ppm, more preferably not more than 15000 ppm, even more preferably not more than 10000 ppm, and most preferably not more than 7500 ppm per weight of the PHA. A refining means is not particularly limited, and can be, for example, the foregoing publicly known method.

Note that a solvent (the "solvent" may be referred to also as "aqueous medium") contained in the aqueous PHA suspension in the present production method may be water or a mixed solvent of water and an organic solvent. In the mixed solvent, the concentration of the organic solvent, which is compatible with water, is not particularly limited, provided that the concentration is equal to or lower than the solubility, in water, of the organic solvent used. The organic solvent compatible with water is not particularly limited. Examples of the organic solvent compatible with water include: alcohols such as methanol, ethanol, 1-propanol, 2-propanol, 1-butanol, 2-butanol, iso-butanol, pentanol, hexanol, and heptanol; ketones such as acetone and methyl ethyl ketone; ethers such as tetrahydrofuran and dioxane; nitriles such as acetonitrile and propionitrile; amides such as dimethylformamide and acetamide; dimethyl sulfoxide; pyridine; and piperidine. Among these examples, methanol, ethanol, 1-propanol, 2-propanol, 1-butanol, 2-butanol, iso-butanol, acetone, methyl ethyl ketone, tetrahydrofuran, dioxane, acetonitrile, propionitrile, and the like are preferable as the organic solvent compatible with water, because they are easy to remove. As the organic solvent compatible with water, methanol, ethanol, 1-propanol, 2-propanol, butanol, acetone, and the like are more preferable, because they are easy to obtain. As the organic solvent compatible with water, methanol, ethanol, and acetone are particularly preferable. Note that the aqueous medium contained in the aqueous PHA suspension may contain another solvent, a microbial cell-derived component, a compound which is generated during refinement, and/or the like, provided that the essentials of the present invention are not impaired.

The aqueous medium contained in the aqueous PHA suspension in the present production method preferably contains water. The amount of water contained in the aqueous medium is preferably not less than 5% by weight, more preferably not less than 10% by weight, even more preferably not less than 30% by weight, and particularly preferably not less than 40% by weight.

Others

The aqueous PHA suspension that has not been subjected to the step (a) of the present production method ordinarily has a pH of more than 7 by being subjected to the above refining step. As such, by the step (a) of the present production method, the pH of the aqueous PHA suspension is adjusted to not more than 7. A method of adjusting the pH is not particularly limited. For example, the pH can be adjusted by adding an acid. The acid is not particularly limited, and may be an organic acid or an inorganic acid. The acid may or may not be volatile. More specifically, examples of the acid include sulfuric acid, hydrochloric acid, phosphoric acid, and acetic acid.

The upper limit of the pH of the aqueous PHA suspension which is adjusted in the above adjusting step is not more than 7, preferably not more than 5, and more preferably not more than 4, from the viewpoint of reducing coloring of the PHA during heating and melting of the PHA and from the viewpoint of ensuring the stability of the molecular weight of the PHA during heating and/or drying of the PHA. The lower limit of the pH is preferably not less than 1, more preferably not less than 2, and even more preferably not less than 3, from the viewpoint of the acid resistance of a container. By causing the pH of the aqueous PHA suspension to be not more than 7, the PHA is obtained which is reduced in coloring during heating and melting of the PHA and which is prevented from decreasing in molecular weight during heating and/or drying of the PHA.

In the step (a) of the present production method, the pH of the aqueous PHA suspension may be adjusted before the aqueous PHA suspension is introduced into a twin screw extruder or after the aqueous PHA suspension is introduced into the twin screw extruder. In a case where the pH of the aqueous PHA suspension is adjusted after the aqueous PHA suspension is introduced into the twin screw extruder, it is possible to adjust the pH of the aqueous PHA suspension to not more than 7 by first introducing the aqueous PHA suspension into the twin screw extruder and then introducing the above-described acid or the like into the twin screw extruder. The acid or the like is preferably introduced into the twin screw extruder before the aqueous PHA suspension is heated in the twin screw extruder. This makes it possible to obtain an aggregate of the PHA which is reduced in coloring during heating and melting of the PHA in the twin screw extruder and which is prevented from decreasing in molecular weight during heating and/or drying of the PHA (hereinafter, the aggregate of the PHA may be referred to as "PHA aggregate").

The concentration of the PHA contained in the aqueous PHA suspension which is obtained by the step (a) of the present production method is preferably not less than 30% by weight, more preferably not less than 40% by weight, and even more preferably not less than 50% by weight, from the viewpoint of (i) an economical advantage in terms of utility in drying and (ii) a resultant improvement in productivity.

The upper limit of the concentration of the PHA is preferably not more than 70% by weight, and more preferably not more than 65% by weight, because, otherwise, it may not be possible to ensure sufficient flowability due to closest packing. A method of adjusting the concentration of the PHA is not particularly limited. For example, the concentration can be adjusted by adding an aqueous medium or by removing part of the aqueous medium (e.g., by centrifugal separation followed by removal of a supernatant). Adjustment of the concentration of the PHA may be carried out at any stage in the step (a) or may be carried out prior to the step (a).

In an embodiment of the present invention, the present production method is arranged such that the concentration of the polyhydroxyalkanoate contained in the aqueous suspension which is prepared in the step (a) is 30% by weight to 70% by weight.

(Step (b))

In the step (b) of the present production method, the aqueous PHA suspension prepared in the step (a) is heated at a temperature set at 80° C. to 300° C. in the twin screw extruder so as to aggregate the PHA. Namely, in the step (b), it is possible to obtain the PHA aggregate by introducing the aqueous PHA suspension into the twin screw extruder and then, while heating the aqueous PHA suspension at a specific temperature, causing the aqueous PHA suspension to move in the twin screw extruder. In so doing, the PHA aggregate may be obtained by directly introducing pressurized steam into the twin screw extruder so as to heat the aqueous PHA suspension. In so doing, the PHA bonds together by thermal fusion, so that the PHA aggregate is obtained. The PHA aggregate obtained by the step (b) is a massive PHA, and has a particle size larger than that of a powdery PHA which is obtained by a spray drying step. Thus, the PHA aggregate is easy to handle.

In an embodiment of the present invention, the above set temperature in the twin screw extruder (a temperature set on a heater 3 or the temperature of the pressurized steam which is introduced from a pressurized steam introduction part) in the step (b) is not particularly limited, provided that the PHA aggregate is obtained by thermal fusion. The set temperature is, for example, 80° C. to 300° C., preferably 100° C. to 250° C., more preferably 120° C. to 240° C., and particularly preferably 140° C. to 220° C. In a case where the set temperature in the twin screw extruder in the step (b) is not lower than 80° C., it is possible to sufficiently volatilize water contained in the aqueous PHA suspension. In a case where the set temperature in the twin screw extruder in the step (b) is not higher than 200° C., it is possible to avoid a decrease in molecular weight of the PHA constituting the PHA aggregate which decrease is caused by decomposition of the PHA aggregate.

A heating method in the step (b) is not particularly limited. For example, heating can be carried out with use of an electric heater, a steam heater, an oil heater, or the like, or can be alternatively carried out by directly introducing pressurized steam into the twin screw extruder. Moreover, heating time is also not particularly limited, and can be set as appropriate by a person skilled in the art.

In the step (b), the rotational speed of a screw part (also referred to as "screw rotational speed") of the twin screw extruder is not particularly limited, and is, for example, 20 rpm to 1000 rpm, preferably 25 rpm to 800 rpm, and more preferably 28 rpm to 700 rpm. In a case where the rotational speed of the screw part of the twin screw extruder is not less than 20 rpm, it is possible to prevent the PHA from adhering to the screw part. In a case where the rotational speed of the screw part of the twin screw extruder is not more than 1000 rpm, it is possible to effectively aggregate the PHA.

In an embodiment of the present invention, a portion of the screw part of the twin screw extruder may have a backward feeding function (hereinafter, such a portion will be also referred to "return screw portion"). In a case where the twin screw extruder includes a return screw portion, the aqueous PHA suspension is pressurized by the return screw portion. As a result, heat is transmitted not only to a surface of the aqueous PHA suspension but also to the inside of the aqueous PHA suspension uniformly. This makes it possible to cause uniform thermal fusion while causing moisture not to evaporate.

In an embodiment of the present invention, the number of return screw portions is not particularly limited, and may be one or may be alternatively two or more (for example, two, three, four, or five).

In an embodiment of the present invention, a pressure in the twin screw extruder in the step (b) is not particularly limited, provided that the PHA aggregate is obtained by thermal fusion. For example, the pressure is 0.01 Mpa to 0.5 Mpa, preferably 0.05 Mpa to 0.5 Mpa, and more preferably 0.08 Mpa to 0.5 Mpa. In a case where the twin screw extruder includes a return screw portion, the pressure in the twin screw extruder tends to be high as described above. The pressure in the twin screw extruder in the step (b) in a case where the twin screw extruder includes a return screw portion is, for example, 0.1 Mpa to 0.5 Mpa, preferably 0.2 Mpa to 0.5 Mpa, and more preferably 0.25 Mpa to 0.5 Mpa.

In an embodiment of the present invention, it is possible to, in the step (b), combine, as appropriate, the set temperature in the twin screw extruder, the rotational speed of the screw part of the twin screw extruder, the return screw portion, the pressure in the twin screw extruder, and the like in order to obtain the PHA aggregate which is desired.

The twin screw extruder used in the present production method is not particularly limited, provided that the PHA aggregate is obtained from the aqueous PHA suspension. However, the twin screw extruder is preferably configured such that the set temperature, the rotational speed of the screw part, the pressure, and the like can be adjusted in respective desired ranges. Note that FIGS. 1 to 5 each schematically illustrates a typical twin screw extruder which can be used in the present production method. A commercially available twin screw extruder used in the present production method is not particularly limited, and can be, for example, EA-20 manufactured by SUEHIRO EPM CORPORATION and used in Examples, an S2KRC kneader manufactured by Kurimoto Ltd., TEX60a manufactured by The Japan Steel Works, LTD., or the like.

As has been described, the present production method makes it possible to obtain the PHA aggregate. It can be indicated by an index that the PHA aggregate has been obtained, a value of the index being expressed by the following Expression (1):

the volume median diameter of the PHA aggregate obtained in the step (b)/the volume median diameter of PHA primary particles    (1).

Note that, in this specification, the term "PHA primary particles" means particles of the PHA contained in the aqueous polyhydroxyalkanoate suspension prepared in the step (a). Note also that the expression "the volume median diameter of the PHA aggregate" can be also referred to as "average particle size of the PHA aggregate". Note also that the expression "the volume median diameter of PHA primary particles" can be also referred to as "PHA primary particle size".

In an embodiment of the present invention, the value expressed by the above Expression (1) is, for example, 50 to 20000, preferably 100 to 15000, and more preferably 150 to 10000.

The "volume median diameter of the PHA aggregate" is measured by the following method. That is, 0.05 g of sodium dodecyl sulfate, which is a surfactant, is added, as a dispersion agent, to 20 ml of ion-exchange water to obtain an aqueous surfactant solution. Subsequently, 0.2 g of a resin particle group which is a target of measurement is added to the aqueous surfactant solution, and is dispersed in the aqueous surfactant solution to obtain dispersion slurry for measurement. The prepared dispersion slurry is introduced into a laser diffraction/scattering type particle size distribution measurement apparatus LA-950 manufactured by HORIBA so that the volume median diameter of the PHA aggregate is measured.

The "volume median diameter of PHA primary particles" is measured with use of a laser diffraction/scattering type particle size distribution measurement apparatus LA-950 manufactured by HORIBA.

The following description will discuss typical embodiments of the present production method. Note, however, that the present production method is obviously not limited to the embodiments.

Embodiment 1

The following description will discuss Embodiment 1 with reference to FIG. 1.

A twin screw extruder used in Embodiment 1 includes a screw part 2 which transfers a sample that has been introduced, an extruder power source 4 which supplies power for rotating the screw part 2, a heater 3 which controls a temperature in the twin screw extruder, and an extrusion part (discharge part) 5 through which the sample that has been transferred is extruded. A temperature set on the heater 3 can be, for example, 140° C. to 150° C.

An aqueous PHA suspension, which is the sample, is introduced into the twin screw extruder from an aqueous PHA suspension introduction part 10. In Embodiment 1, the pH of the aqueous PHA suspension which has not been introduced into the twin screw extruder is adjusted to not more than 7. That is, the aqueous PHA suspension which has a pH of not more than 7 is introduced into the twin screw extruder. The amount of the aqueous PHA suspension which is introduced into the twin screw extruder is controlled by a valve 8. The aqueous PHA suspension which has been introduced into an extruder internal region 1 is transferred toward the extrusion part (discharge part) 5 by the screw part 2. While the aqueous PHA suspension is transferred, the aqueous PHA suspension is heated at a constant temperature by the heater 3, so that moisture contained in the aqueous PHA suspension evaporates. A PHA contained in the aqueous PHA suspension bonds together by thermal fusion, and is discharged as a PHA aggregate through the extrusion part (discharge part) 5. In Embodiment 1, it is possible to most easily obtain the PHA aggregate from the aqueous PHA suspension.

Embodiment 2

Figure 2:
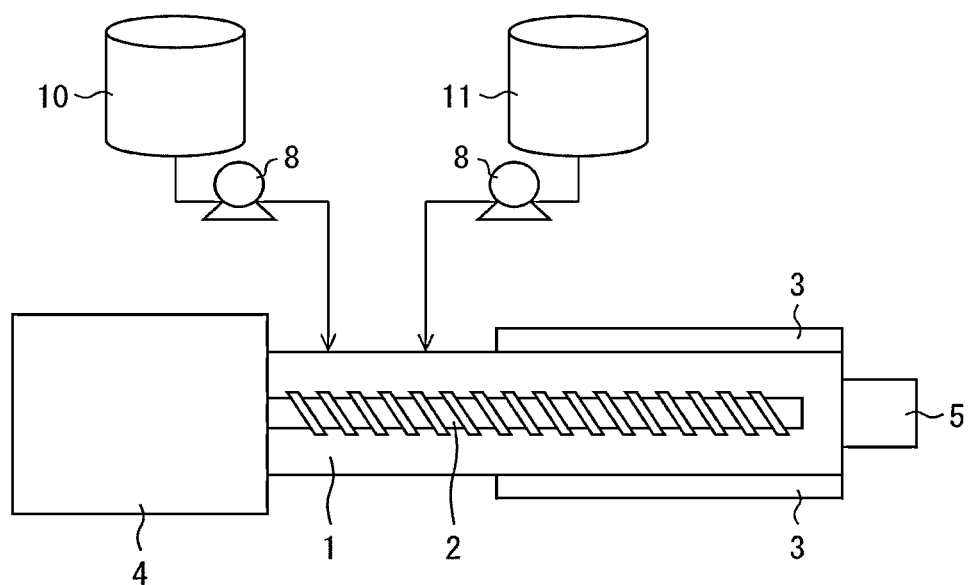
FIG. 2 is a drawing schematically illustrating a method for producing a PHA in accordance with an embodiment of the present invention.

The following description will discuss Embodiment 2 with reference to FIG. 2.

A twin screw extruder used in Embodiment 2 is identical to the twin screw extruder used in Embodiment 1.

An aqueous PHA suspension, which is a sample, is introduced into the twin screw extruder from an aqueous PHA suspension introduction part 10. In Embodiment 2, the pH of the aqueous PHA suspension which has not been introduced into the twin screw extruder is not adjusted to not more than 7. That is, the aqueous PHA suspension which has a pH of more than 7 is introduced into the twin screw extruder. The aqueous PHA suspension which has been introduced into an extruder internal region 1 is adjusted so as to have a pH of not more than 7, by introduction of an acid from an acid introduction part 11. The amount of the acid which is introduced is controlled by a valve 8. In the same manner as in Embodiment 1, the aqueous PHA suspension which has been adjusted so as to have a pH of not more than 7 is transferred toward an extrusion part (discharge part) 5 by a screw part 2, and a PHA aggregate is obtained. In Embodiment 2, it is possible to collectively carry out, in the extruder internal region 1, adjustment of the pH of the aqueous PHA suspension and drying of the aqueous PHA suspension.

Embodiment 3

Figure 3:
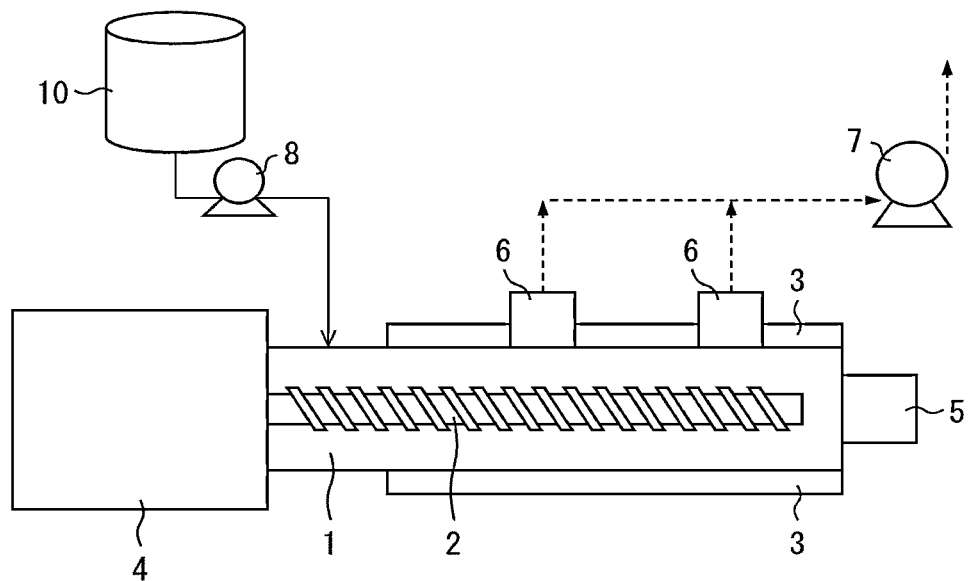
FIG. 3 is a drawing schematically illustrating a method for producing a PHA in accordance with an embodiment of the present invention.

The following description will discuss Embodiment 3 with reference to FIG. 3.

A twin screw extruder used in Embodiment 3 is obtained by providing, to the twin screw extruder used in Embodiment 1, a decompression part 6 for reducing a pressure in the twin screw extruder. The decompression part 6 is connected to a vacuum pump 7. By operating the vacuum pump 7, air in the twin screw extruder is discharged via the decompression part 6, so that a pressure in the twin screw extruder is reduced. Note that the decompression part 6 may be configured such that the twin screw extruder is opened to the atmosphere via the decompression part 6. By the twin screw extruder being opened to the atmosphere, it is possible to discharge, outside the twin screw extruder, moisture which is contained in an aqueous PHA suspension and which evaporates in the twin screw extruder, and thus possible to increase efficiency of evaporation.

By reducing the pressure in the twin screw extruder with use of the vacuum pump 7, it is possible to promote evaporation of the moisture contained in the aqueous PHA suspension. Moreover, even in a case where a temperature in the twin screw extruder is lowered, it is possible to dry the aqueous PHA suspension, and thus possible to prevent a PHA from decomposing (decreasing in molecular weight).

As a variation of Embodiment 3, there is an aspect in which the acid introduction part 11 and the valve 8 described in Embodiment 2 are provided to the embodiment illustrated in FIG. 3. According to this variation, it is possible to introduce, into the twin screw extruder, the aqueous PHA suspension the pH of which is not adjusted to not more than 7 (which has a pH of more than 7), and then adjust the pH of the aqueous PHA suspension to not more than 7 in the twin screw extruder.

Embodiment 4

Figure 4:
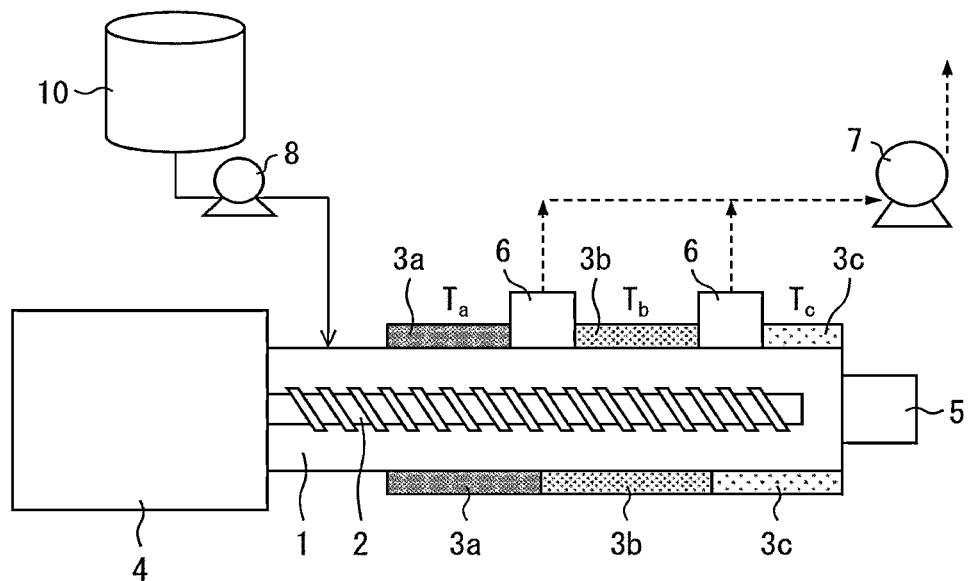
FIG. 4 is a drawing schematically illustrating a method for producing a PHA in accordance with an embodiment of the present invention.

The following description will discuss Embodiment 4 with reference to FIG. 4.

A twin screw extruder used in Embodiment 4 is obtained by arranging the twin screw extruder used in Embodiment 3 such that the heater 3 is divided into a plurality of regions which are respective different temperature zones. Specifically, in Embodiment 4, the heater 3 is divided into a high temperature part 3a, a medium temperature part 3b, and a low temperature part 3c which are respective different temperature zones. The temperature of the high temperature part 3a, the temperature of the medium temperature part 3b, and the temperature of the low temperature part 3c are represented as $T_a$, $T_b$, and $T_c$, respectively. $T_a$, $T_b$, and $T_c$ has, for example, a relationship such that $T_a > T_b > T_c$. First, in the region of the high temperature part 3a, moisture contained in an aqueous PHA suspension which has been introduced into the twin screw extruder evaporates. Then, moisture remaining in the aqueous PHA suspension evaporates in the regions of the medium temperature part 3b and the low temperature part 3c. $T_a$, $T_b$, and $T_c$ can be, for example, 150° C., 120° C., and 80° C., respectively. In this manner, in Embodiment 4, by lowering a temperature in the twin screw extruder stepwise toward the extrusion part (discharge part) 5 from the region in which the aqueous PHA suspension is introduced, it is possible to prevent a PHA from decomposing (decreasing in molecular weight).

The number of different temperature zones in the heater 3 can be set as appropriate. Note also that a temperature in each of the temperature zones can be set as appropriate.

As a variation of Embodiment 4, there is an aspect in which the acid introduction part 11 and the valve 8 described in Embodiment 2 are provided to the embodiment illustrated in FIG. 4. According to this variation, it is possible to introduce, into the twin screw extruder, the aqueous PHA suspension the pH of which is not adjusted to not more than 7 (which has a pH of more than 7), and then adjust the pH of the aqueous PHA suspension to not more than 7 in the twin screw extruder.

Embodiment 5

Figure 5:
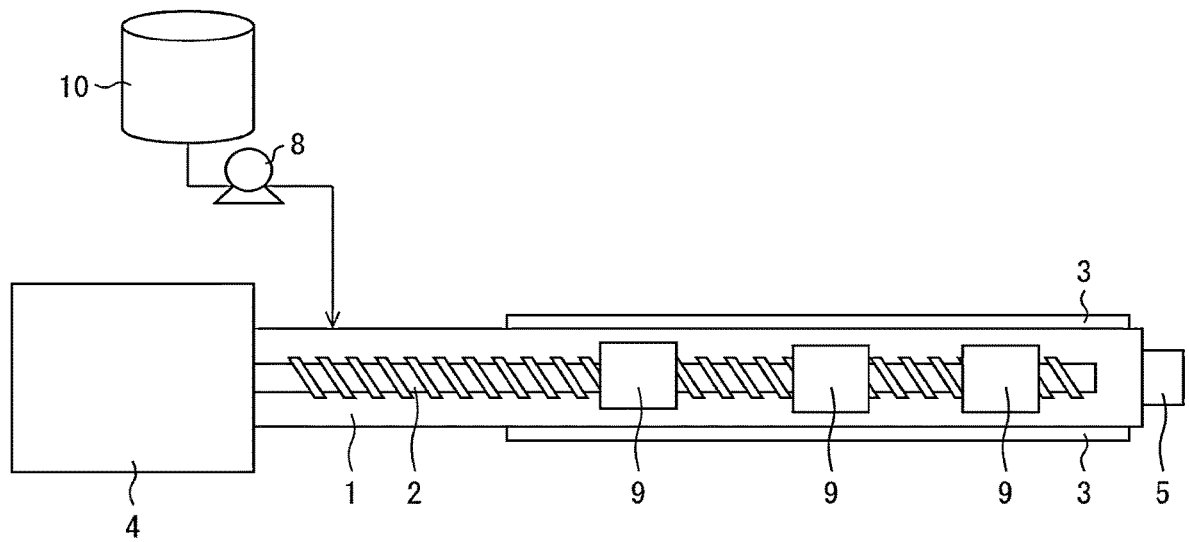
FIG. 5 is a drawing schematically illustrating a method for producing a PHA in accordance with an embodiment of the present invention.

The following description will discuss Embodiment 5 with reference to FIG. 5.

A twin screw extruder used in Embodiment 5 is obtained by providing, to a portion of the screw part 2 of the twin screw extruder used in Embodiment 1, a screw portion 9 having a backward feeding function (return screw portion). The screw portion 9 having a backward feeding function (return screw portion) has a function of pushing back an aqueous PHA suspension in a direction opposite from a direction in which the aqueous PHA suspension is transferred. The aqueous PHA suspension which has been transferred in the extruder internal region 1 by the screw part 2 is pressurized in regions in which the screw portion 9 having a backward feeding function (return screw portion) is provided. As a result, heat is transmitted not only to a surface of the aqueous PHA suspension but also to the inside of the aqueous PHA suspension uniformly. This makes it possible to cause uniform thermal fusion while causing moisture not to evaporate.

As a variation of Embodiment 5, there is an aspect in which the acid introduction part 11 and the valve 8 described in Embodiment 2 are provided to the embodiment illustrated in FIG. 5. According to this variation, it is possible to introduce, into the twin screw extruder, the aqueous PHA suspension the pH of which is not adjusted to not more than 7 (which has a pH of more than 7), and then adjust the pH of the aqueous PHA suspension to not more than 7 in the twin screw extruder.

Embodiment 6

Figure 6:
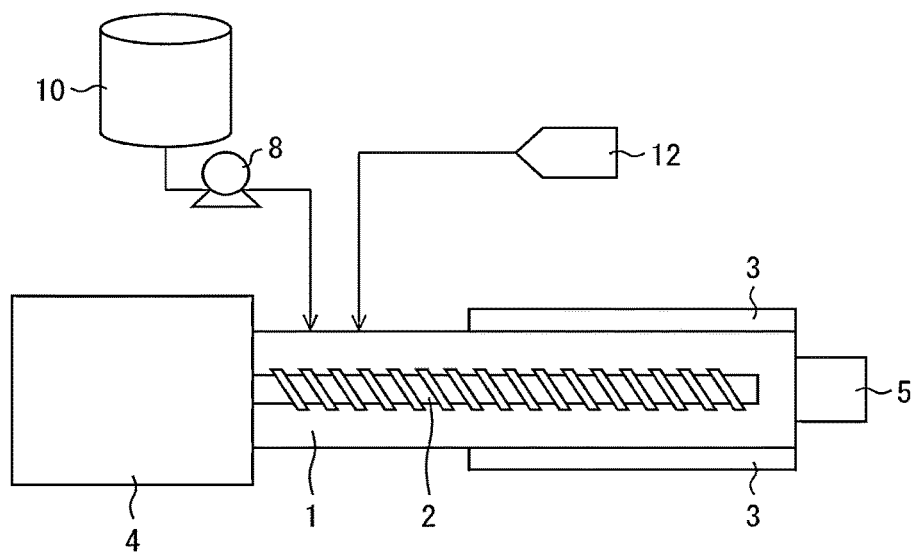
FIG. 6 is a drawing schematically illustrating a method for producing a PHA in accordance with an embodiment of the present invention.

The following description will discuss Embodiment 6 with reference to FIG. 6.

A twin screw extruder used in Embodiment 6 is obtained by providing a pressurized steam introduction port 12 to the twin screw extruder used in Embodiment 1. By introducing pressurized steam from the pressurized steam introduction port 12, it is possible to sharply raise the temperature of an aqueous PHA suspension. This makes it possible to cause uniform thermal fusion while causing moisture not to evaporate.

As a variation of Embodiment 6, there is an aspect that has the configuration which is described in Embodiment 5 and in which the screw portion 9 having a backward feeding function (return screw portion) is provided to a portion of the screw part 2 of the twin screw extruder.

As another variation of Embodiment 6, there is an aspect in which the acid introduction part 11 and the valve 8 described in Embodiment 2 are provided to the embodiment illustrated in FIG. 6. According to this variation, it is possible to introduce, into the twin screw extruder, the aqueous PHA suspension the pH of which is not adjusted to not more than 7 (which has a pH of more than 7), and then adjust the pH of the aqueous PHA suspension to not more than 7 in the twin screw extruder.

A drying step may be further added so that the water content of a PHA aggregate obtained in each of Embodiments 1 to 6 is further reduced. A drying method is not particularly limited, and drying can be carried out with use of, for example, a band dryer, a conveyor dryer, a rotary dryer, or the like.

3. PHA Aggregate

A PHA aggregate in accordance with an embodiment of the present invention (hereinafter, referred to as "present PHA aggregate") contains a PHA in an amount of not less than 97% by weight under the condition that the amount of moisture is excluded, and has a volume median diameter of not less than 300 μm. The present PHA aggregate is produced by the present production method. Therefore, the present PHA aggregate has an advantage of being obtained with a simple operation. Note that the expression "contains a PHA in an amount of not less than 97% by weight under the condition that the amount of moisture is excluded" can be rephrased as follows: the present PHA aggregate contains the PHA in an amount of not less than 97% by weight with respect to the total amount of the PHA and impurities, which total amount is obtained by excluding the amount of the moisture from the amount of all components (the PHA, the moisture, and the impurities) contained in the present PHA aggregate. Note that the PHA aggregate in this specification also includes a PHA granule.

The present PHA aggregate can be produced by the above-described characteristic production method. Thus, since a sticking agent or the like is not needed, it is possible for the PHA aggregate to contain the PHA in a large amount, as compared with a pellet containing a PHA powder. The present PHA aggregate can be rephrased as a granulated PHA.

The amount of the PHA contained in the present PHA aggregate is not particularly limited, and only needs to be not less than 97% by weight. However, the amount of the PHA contained in the present PHA aggregate is preferably not less than 98% by weight, more preferably not less than 99% by weight, and even more preferably not less than 99.5% by weight, from the viewpoint of an effect on processability. The upper limit of the amount of the PHA contained in the present PHA aggregate is not particularly limited, and is, for example, not more than 100% by weight. The amount of the PHA contained in the present PHA aggregate is measured with use of a high-performance liquid chromatograph.

Furthermore, the present PHA aggregate can be produced by the above-described characteristic production method. Thus, it is possible to obtain the PHA aggregate which has a large size, as compared with a pellet containing a PHA powder.

The volume median diameter (size) of the present PHA aggregate is not particularly limited, and only needs to be not less than 300 μm. However, the volume median diameter (size) of the present PHA aggregate is preferably not less than 350 μm, more preferably not less than 380 μm, and even more preferably not less than 400 μm, from the viewpoint of flowability. The upper limit of the volume median diameter of the present PHA aggregate is not particularly limited, and is, for example, not more than 5 mm. Note that the volume median diameter of the present PHA aggregate is measured by the above-described method. Moreover, the shape of the present PHA aggregate is not particularly limited, and the present PHA aggregate can have various shapes such as a particulate shape, a spherical shape, an irregular shape, a rectangular shape (polygonal shape), and a cylindrical shape.

The present PHA aggregate may contain various components which have been produced or have not been removed during the present production method, provided that an effect of the present invention is brought about.

Note that the description given in the above [2. Method for producing PHA] applies to the matters which have not been particularly described in the present embodiment.

The present PHA aggregate can be used for various applications such as paper, films, sheets, tubes, plates, rods, containers (e.g., bottle containers and the like), bags, and parts.

The present invention is not limited to the embodiments, but can be altered by a skilled person in the art within the scope of the claims. The present invention also encompasses, in its technical scope, any embodiment derived by combining technical means disclosed in differing embodiments.

Namely, the present invention encompasses the following embodiments.

<1> A method for producing a PHA, including the steps of:
(a) preparing an aqueous PHA suspension having a pH of not more than 7; and
(b) heating the aqueous PHA suspension, prepared in the step (a), at a temperature set at 80° C. to 300° C. in a twin screw extruder so as to aggregate a PHA.

<2> The method as described in <1>, wherein a heating method in the step (b) is a method in which a heater provided to the twin screw extruder is used and/or a method in which pressurized steam is directly introduced into the twin screw extruder.

<3> The method as described in <1> or <2>, wherein a value expressed by the following Expression (1) is 50 to 20000:

$$\text{a volume median diameter of a PHA aggregate obtained in the step } (b)/\text{a volume median diameter of PHA primary particles} \quad (1).$$

<4> The method as described in any one of <1> to <3>, wherein, in the step (a), a concentration of the PHA contained in the aqueous PHA suspension is 30% by weight to 70% by weight.

<5> The method as described in any one of <1> to <4>, wherein a rotational speed of a screw part of the twin screw extruder is 30 rpm to 1000 rpm.

<6> The method as described in any one of <1> to <5>, wherein a pressure in the twin screw extruder is 0.01 Mpa to 0.5 Mpa.

<7> The method as described in any one of <1> to <6>, wherein a portion of a screw part of the twin screw extruder has a backward feeding function.

<8> A polyhydroxyalkanoate aggregate containing a polyhydroxyalkanoate in an amount of not less than 97% by weight, the polyhydroxyalkanoate aggregate having a volume median diameter of not less than 300 μm.

EXAMPLES

The following description will discuss embodiments of the present invention in further detail on the basis of Examples. Note, however, that the present invention is not limited to Examples.

Example 1

(Preparation of Microbial Cell Culture Solution)

*Ralstonia eutropha* KNK-005 strain described in paragraph [0049] of International Publication No. WO 2008/010296 was cultured by a method described in paragraphs [0050] to [0053] of the same document to obtain a microbial cell culture solution containing microbial cells containing a PHA. Note that *Ralstonia eutropha* is currently classified as *Cupriavidus necator.*

(Sterilization)

The obtained microbial cell culture solution was sterilized by heating and stirring it at an internal temperature of 60° C. to 80° C. for 20 minutes.

(High-Pressure Crushing)

To the sterilized microbial cell culture solution thus obtained, 0.2% by weight of sodium dodecyl sulfate was added. An aqueous sodium hydroxide solution was further added so that a pH of 11.0 was achieved, and then an obtained solution was kept at 50° C. for 1 hour. Then, the solution was subjected to high-pressure crushing at a pressure of 450 kgf/cm² to 550 kgf/cm² with use of a high-pressure crusher (a high-pressure homogenizer, model PA2K, manufactured by Niro-Soavi).

(Refinement)

To the crushed solution which had been obtained as a result of the high-pressure crushing, distilled water was added in an amount equivalent to the crushed solution. An obtained solution was subjected to centrifugal separation, and then a supernatant was removed. As a result, an aqueous suspension which had been obtained by adding the distilled water was twice concentrated. To the aqueous suspension of the PHA which had been obtained by such concentration, an aqueous sodium hydroxide solution (pH: 11.0) was added in an amount equal to that of the removed supernatant. A suspension which had been obtained by adding the aqueous sodium hydroxide solution was then subjected to centrifugal separation. Subsequently, a supernatant was removed, water was added again, and then suspension was carried out. Then, 0.2% by weight of sodium dodecyl sulfate and protease (Esperase, manufactured by Novozymes) in an amount of 1/100th of the weight of the PHA were added. A suspension which had been obtained by adding the sodium dodecyl sulfate and the protease was stirred for 2 hours while being kept at pH 10.0 and 50° C. The suspension which had been stirred was then subjected to centrifugal separation, and a supernatant was removed. As a result, the suspension which had been obtained by adding the sodium dodecyl sulfate and the protease was four times concentrated. To the suspension which had been obtained by such concentration, water was added so that the concentration of the PHA was adjusted to 53.5% by weight. The volume median diameter of PHA particles (PHA primary particles) contained in the aqueous PHA suspension was measured, and found to be 2.5 μm.
(Granulation with Use of Twin Screw Extruder)

Figure 7:
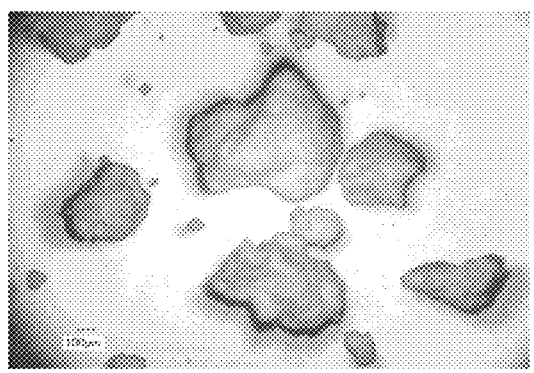
FIG. 7 is a drawing illustrating a PHA aggregate in accordance with an embodiment of the present invention.

To the obtained aqueous PHA suspension, sulfuric acid was added so that the pH was adjusted to 3.0. Obtained slurry was introduced into a twin screw extruder (EA-20, barrel length/barrel diameter (L/D)=12, manufactured by SUEHIRO EPM CORPORATION), and was then extruded under the conditions that a screw rotational speed (rotational speed of a screw part) was 30 rpm, a pressure in the twin screw extruder was 0.1 Mpa, and the temperature of a heater was 150° C. While the slurry passes through the twin screw extruder, water contained in the slurry was volatilized, and a PHA aggregate was collected from an exit part of the twin screw extruder. FIG. 7 illustrates the obtained PHA aggregate. The volume median diameter of the obtained PHA aggregate was 883 μm. A ratio of the volume median diameter of the PHA aggregate to the volume median diameter of the PHA primary particles was 353.2. The amount of the PHA contained in the PHA aggregate was 98.9% by weight.

Example 2

A PHA aggregate was obtained in the same manner as in Example 1, except that the temperature of a heater of a twin screw extruder was 140° C. The volume median diameter of the obtained PHA aggregate was 836 μm. A ratio of the volume median diameter of the PHA aggregate to the volume median diameter of PHA primary particles was 334.4. The amount of a PHA contained in the PHA aggregate was 98.9% by weight.

Example 3

An aqueous PHA suspension was obtained in the same manner, to a step of refinement, as in Example 1. A PHA aggregate was obtained in the same manner as in Example 1, except that (i) sulfuric acid was added to the aqueous PHA suspension so that a pH is adjusted to 5.0, (ii) obtained slurry was introduced into a twin screw extruder (S2KRC kneader, L/D=13.2, manufactured by Kurimoto Ltd.) at a rate of 2.5 kg/h, and (iii) the slurry was extruded under the conditions that a screw rotational speed (rotational speed of a screw part) was 300 rpm, the temperature of a heater was 150° C., and the twin screw extruder was opened to the atmosphere via a decompression part 6 as illustrated in FIG. 3. The volume median diameter of the obtained PHA aggregate was 474 μm. A ratio of the volume median diameter of the PHA aggregate to the volume median diameter of PHA primary particles was 189.6. The amount of a PHA contained in the PHA aggregate was 98.9% by weight.

Example 4

A PHA aggregate was obtained in the same manner as in Example 3, except that a rate of introduction of slurry was 5.0 kg/h. The volume median diameter of the obtained PHA aggregate was 611 μm. A ratio of the volume median diameter of the PHA aggregate to the volume median diameter of PHA primary particles was 244.4. The amount of a PHA contained in the PHA aggregate was 98.9% by weight.

Example 5

A PHA aggregate was obtained in the same manner as in Example 4, except that a screw rotational speed was 100 rpm. The volume median diameter of the obtained PHA aggregate was 444 μm. A ratio of the volume median diameter of the PHA aggregate to the volume median diameter of PHA primary particles was 177.6. The amount of a PHA contained in the PHA aggregate was 98.9% by weight.

Example 6

A PHA aggregate was obtained in the same manner as in Example 3, except that a rate of introduction of slurry was 10.0 kg/h and the temperature of a heater was 165° C. The volume median diameter of the obtained PHA aggregate was 1164 μm. A ratio of the volume median diameter of the PHA aggregate to the volume median diameter of PHA primary particles was 465.6. The amount of a PHA contained in the PHA aggregate was 98.9% by weight.

Comparative Example 1

An operation was carried out in the same manner as in Example 1, except that the temperature of a heater of a twin screw extruder was 50° C. As a result, an aqueous PHA suspension was discharged through a discharge part of the twin screw extruder, and a PHA aggregate was not obtained.
[Results]

As is clear from Examples and FIG. 7, it was found that the present production method makes it possible to produce a PHA with a simple operation.

INDUSTRIAL APPLICABILITY

Since the present production method makes it possible to produce a PHA with a simple operation, the present production method is advantageously used in production of a PHA. Further, a PHA aggregate and the like obtained by the present production method can be suitably used in the fields of agriculture, fishing, forestry, horticulture, medicine, sanitary products, clothing, non-clothing, packaging, automobiles, building materials, and the like.

REFERENCE SIGNS LIST

1 Extruder internal region
2 Screw part
3 Heater
3a High temperature part
3b Medium temperature part
3c Low temperature part 4 Extruder power source
5 Extrusion part (discharge part)
6 Decompression part
7 Vacuum pump
8 Valve
9 Screw portion having a backward feeding function (return screw portion)
10 Aqueous PHA suspension introduction part
11 Acid introduction part
12 Pressurized steam introduction part

The invention claimed is:

1. A method for producing a polyhydroxyalkanoate, comprising:
   (a) preparing an aqueous polyhydroxyalkanoate suspension having a pH of 7 or less; and
   (b) heating the aqueous polyhydroxyalkanoate suspension, prepared in (a), at a temperature set at 80° C. to 300° C. in a twin screw extruder so as to aggregate a polyhydroxyalkanoate,
   wherein a pressure in the twin screw extruder is from 0.01 MPa to 0.5 MPa.

2. The method of claim 1, wherein a heating method in (b) is a method in which a heater provided to the twin screw extruder is used and/or a method in which pressurized steam is directly introduced into the twin screw extruder.

3. The method of claim 1, wherein a value expressed by the following Expression (1) is from 50 to 20000:
   a volume median diameter of a polyhydroxyalkanoate aggregate obtained in (b)/a volume median diameter of polyhydroxyalkanoate primary particles (1).

4. The method of claim 1, wherein, in (a), a concentration of the polyhydroxyalkanoate contained in the aqueous polyhydroxyalkanoate suspension is from 30% by weight to 70% by weight.

5. The method of claim 1, wherein a rotational speed of a screw part of the twin screw extruder is from 30 rpm to 1000 rpm.

6. The method of claim 1, wherein a portion of a screw part of the twin screw extruder has a backward feeding function.

7. The method for producing a polyhydroxyalkanoate of claim 1, wherein a concentration of the polyhydroxyalkanoate contained in the aqueous polyhydroxyalkanoate suspension obtained in (a) is from 40% by weight to 70% by weight.

8. The method for producing a polyhydroxyalkanoate of claim 1, wherein a concentration of the polyhydroxyalkanoate contained in the aqueous polyhydroxyalkanoate suspension obtained in (a) is from 50% by weight to 70% by weight.

* * * * *